March 4, 1969 V. RODEK 3,431,366
TELEPHONE SUBSTATION CIRCUIT EMPLOYING
A CLASS-A CLASS-C TONE DETECTOR
Filed Aug. 2, 1965
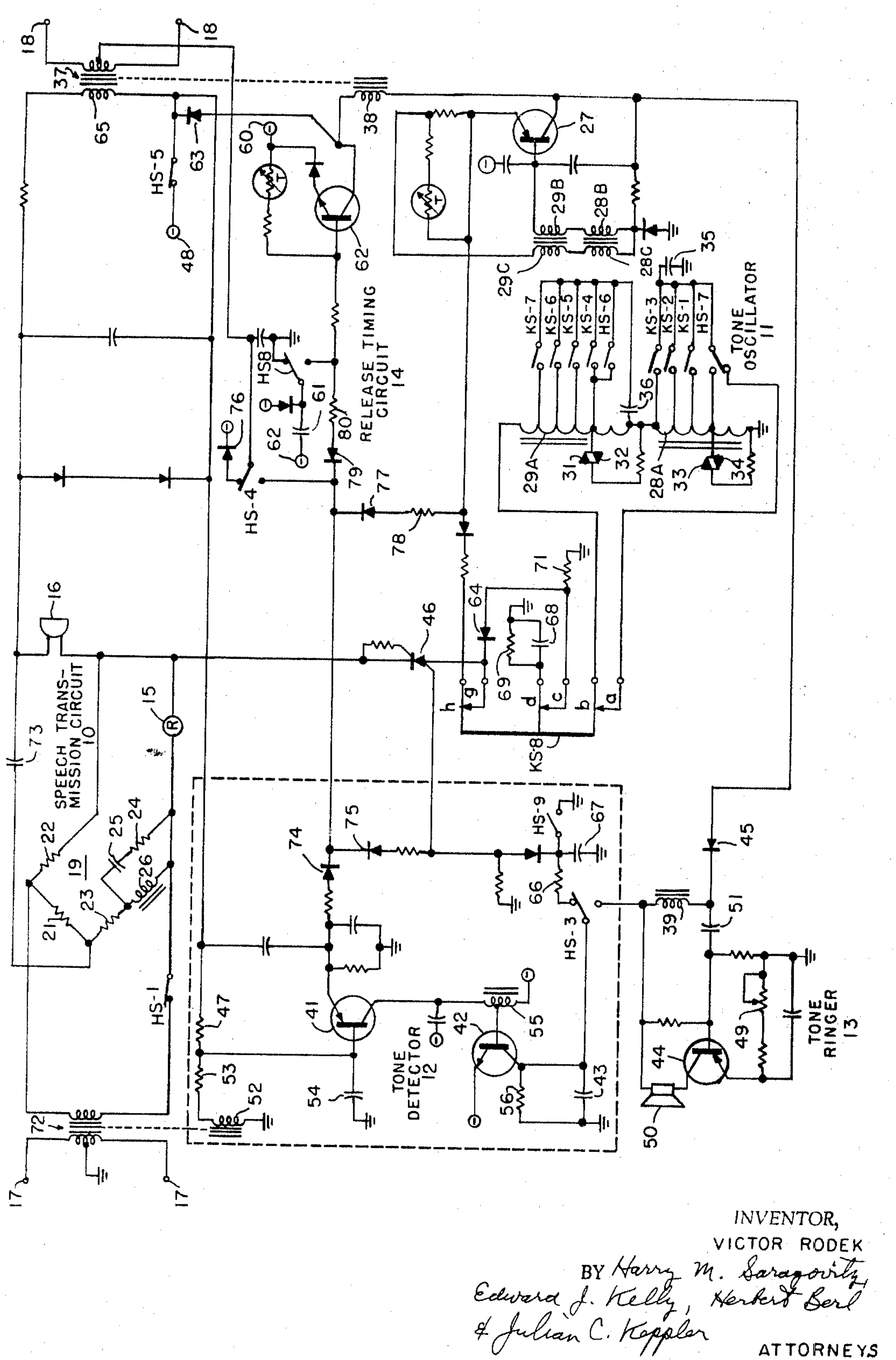
INVENTOR,
VICTOR RODEK
BY Harry M. Saragovitz,
Edward J. Kelly, Herbert Berl
& Julian C. Keppler
ATTORNEYS

United States Patent Office 3,431,366

Patented Mar. 4, 1969

3,431,366

TELEPHONE SUBSTATION CIRCUIT EMPLOYING A CLASS-A CLASS-C TONE DETECTOR

Victor Rodek, Rochester, N.Y., assignor, by mesne assignments, to the United States of America as represented by the Secretary of the Army Filed Aug. 2, 1965, Ser. No. 476,766

U.S. Cl. 179—84 6 Claims

Int. Cl. H04m *1/00;* H03f *3/04;* H04b *1/06*

ABSTRACT OF THE DISCLOSURE

A tone detector for a telephone set which has a different sensitivity between the on-hook and off-hook condition. The detector consists of two stages, the first a tuned amplifier the output of which is connected to a converter which comprises the second stage. In the on-hook condition the converter output powers a tone-ringer. In the off-hook condition it powers a silicon switch gate to enable the microphone and inhibit the tone oscillator.

This invention relates to a tone detector circuit for an electronic desk type telephone instrument. More particularly it relates to a tone detector circuit which is supplied with different bias voltages during on-hook conditions to change the sensitivity thereof.

The tone detector of this invention consists of two stages. The first stage is a tuned amplifier the output of which is connected to the second stage, a converter, which develops a DC potential across a capacitor in the presence of a true input signal. In the on-hook condition the amplifier is biased for class C operation and detects the ringing signal at a range from 0 to −9 dbm. The DC potential from the converter then powers a tone ringer and enables a tone oscillator. In the off-hook condition the amplifier becomes biased for class A operation and its sensitivity is increased so that it can detect incoming signals in a range of −18 dbm to −27 dbm. In the presence of a ring signal or a ring-trip-trip signal the tone detector output now supplies power to a silicon switch which inhibits the tone oscillator and enables the microphone.

The off-hook sensitivity of the tone detector is increased by connecting bias to the amplifier stage through a pair of hookswitch contacts. During class C operation the amplifier draws little current, thus conserving current for the on-hook condition.

An object of this invention is to provide a tone detector for use in an electronic telephone set, said detector using the same circuitry for class A and class C operation, thereby reducing the number of circuit components and conserving current during the on-hook condition.

Another object of this invention is to increase the sensitivity of a telephone tone detector during the off-hook condition.

These and other objects and advantages of this invention will become apparent with reference to the following specification when considered in relation to the accompanying drawing in which the single figure is a schematic circuit diagram of an electronic desk-type telephone instrument.

All of the hookswitches shown in the figure are in the off-hook condition.

The circuit is subdivided into five sections, namely, the speech transmission circuit 10, tone oscillator 11, tone detector 12, tone ringer 13 and release timing circuit 14. This invention is directed to the tone detector 12 which is shown within the dashed lines in the drawing, but a brief description of the entire circuit is helpful to the discussion of the tone detector circuit due to the interconnections between it and the remaining sections of the telephone.

The speech transmission circuit 10 couples the handset receiver 15 and microphone 16 to the receive terminals 17 and the send terminals 18, respectively, and it introduces speech and digit-tone sidetone into the transmission path. The handset transducer coupling and the introduction of sidetone is achieved by means of a bridge circuit 19. Two arms of the bridge circuit are pure resistances composed of resistors 21 and 22. The other two arms are complex impedances. One of these arms is the handset receiver 15 and the remaining arm (RCL) consists of resistors 23 and 24, capacitor 25 and inductor 26. This RCL arm provides an impedance equal to approximately three times the impedance of the receiver 15. Therefore, since the bridge is balanced, two thirds of the energy generated at the handset microphone 16 will appear at the receiver 15 as sidetone and no energy is delivered to the receive terminals 17. However, approximately three fourths of the energy received at terminals 17 is delivered to the receiver 15.

The tone oscillator 11 is a dual-frequency oscillator which consists essentially of a transistor 27, transformers 28 and 29, and diodes 31–32, and 33–34. The high-frequency band transformer consist of tuning-circuit winding 28A, base-circuit winding 28B, and emitter-circuit winding 28C. The low-frequency band transformer consists of tuning-circuit winding 29A, base-circuit winding 29B, and emitter-circuit winding 29C. Diodes 33–34 and 31–32 form amplitude-sensitive elements associated with the high-band and low-band transformers, respectively.

In steady-state oscillation, the voltage gain from the base to the emitter of transistor 27 is approximately unity and the voltage ratio of the transformers 28 and 29 from the emitter to the base exceeds unity to provide sufficient posotive feedback to maintain oscillation. The net gain of the feedback path is maintained exactly at unity by the action of the amplitude-sensitive elements (diodes 31–32 and 33–34). Simultaneously oscillation at two frequencies is accomplished by the action of the amplitude-sensitive elements which allow linear operation of the active element, transistor 27.

Digit-tone frequency selection is achieved by means of digit keysender switches KS–1 through KS–7, which connect tuning capacitors 35 and 36 to portions of the tuning-circuit windings of transformers 28A and 29A, respectively. Release tone and tone ringer frequencies are selected by means of hookswitch contacts HS–7 and HS–6. Seize frequency is selected by means of hookswitch contact HS–7 and common keysender switch contacts *a* and *b* of KS–8. The oscillator output to the send terminals 18 is transmitted by way of winding 38 of transformer 37. The oscillator signal to the tone ringer circuit is developed at inductor 39.

The tone oscillator performs the following three functions: (1) it generates all compound-frequency tones required for digit and release signals, (2) it generates a single frequency tone required for seize signal, and (3) it generates a compound-frequency tone required for tone ringing.

The tone detector 12, to which this application is primarily directed, consists of two stages. The first stage consists of a tuned amplifier transistor 41, the base of which is connected to a winding 52 of transformer 72 by a resistor 53. A capacitor 54 is connected in parallel with the series combination of the resistor 53 and the winding 52. Winding 52 and capacitor 54 comprise a parallel resonant circuit which is tuned, in this case, to 570 Hz. and therefore discriminates against unwanted frequencies. The output of the LC network is taken to the second stage 42 by auto transformer 55. The collector of transistor 41 is connected to an autotransformer 55, the output tap of which is connected to the base of a converter transistor 42. A parallel RC network comprising capacitor 43 and resistor 56 is connected between the collector of transistor 42 and the reference potential. In the presence of a true signal transistor 42 develops a DC potential across capacitor 43. In the on-hook condition the DC potential powers a tone-ringer amplifier transistor 44 over hookswitch contact HS–3; and enables the tone oscillator through inductor 39 and diode 45.

In the off-hook condition, the tone detector supplies power to the silicon switch 46. The tone detector off-hook sensitivity is increased by means of class A bias provided by resistor 47 which is connected to a source of negative bias potential 48 by a hookswitch contact HS–5. The tone detector as biased in this manner responds to signal levels of −27 dbm at the receive terminals.

In the on-hook condition the tone detector converts an incoming ringing signal into a DC potential which is used to power the tone oscillator 11 and the tone ringer 13. It performs this conversion selectively at a predetermined signal frequency in order to prevent ringing on signals other than a true ringing signal in the off-hook condition it converts an incoming dial tone, ring signal, or ring-trip-trip signal into a DC potential which is used to operate the silicon switch 46, which in turn enables the microphone 16 and inhibits the tone oscillator 11. It performs this conversion selectively at a predetermined signal frequency in order to prevent false operation due to signals other than the true signal.

The tone ringer 13 produces an audible tone in the presence of an incoming ringing signal. It consists of the single-stage transistor amplifier 44, which is powered by the action of the tone detector. The tone-ringer output level can be varied by means of a potentiometer 49. Tone-ringer transducer 50 may consist of a handset receiver mounted in a radiator horn.

The input to the tone ringer is provided by the tone oscillator which operates at release tone frequencies when powered from the tone detector. The action of a coupling capacitor 51 and inductor 39 is such that the lower frequency of the tone oscillator signal (941 c.p.s.) is attenuated; therefore, the higher frequency (1,632 c.p.s.) is predominant. The acoustical output of the tone ringer is rich in harmonics, which provides an output with a broad frequency spectrum.

The function of the release timing circuit 14 is to power the tone oscillator during the release signal interval and to control the time duration of the release signal. In the off-hook condition, a capacitor 61 is charged to the battery potential since one of its terminals is connected to a source 62 of negative potential and its other terminal is connected to a reference potential by the hookswitch HS–8. During the on-hook condition, capacitor 61 discharges across the base circuit of a transistor 62 and turns it on. When transistor 62 is turned on, it supplies power to the tone oscillator from a source 60. When capacitor 61 discharges to a sufficient level, transistor 62 stops conducting and release signal ceases. Low on-hook standby currents are made possible by the use of a silicon transistor for the transistor 62.

*Originating a call*

When the telephone handset is lifted off-hook, contact HS–7 of the hookswitch and digit keysender common switch contacts *a* and *b* of KS–8 prepare the tone oscillator for operation at the seize frequency (570 c.p.s.). Hookswitch contact HS–5 closes and applies battery potential through diodes 63 to that tone oscillator and causes it to operate at the seize frequency. While seize tone is being transmitted, silicon switch 46 is not conducting so the DC path of microphone 16 is blocked. At the same time, the microphone and a diode 64 provide an AC path to winding 65 of transformer 37. Diode 64 offers a high impedance to the signal seen at transformer 37 (winding 65) since diode 64 is reverse-biased. The signal voltage seen at winding 65 of transformer 37 is approximately 2 volts peak-to-peak. The seize-tone power developed across the microphone 16 is negligible.

Hookswitch contact HS–5 prepares the tone detector to detect dial tone and hookswitch HS–3 allows the detector output to operate silicon switch 46. When dial tone appears, the tone detector output which appears at the collector of transistor 42, supplies power to a timing circuit comprising a resistor 66 and a capacitor 67. When capacitor 67 has charged to a sufficient level, silicon switch 46 conducts, the microphone is enabled and a tone oscillator inhibit signal is applied over switch contacts *g* and *h* of switch KS–8. In the on-hook condition, a hookswitch contact HS–9 discharges capacitor 67.

The circuit is now prepared for digit selection. When a keysender pushbutton switch is depressed, the following operations take place:

(1) Two of the seven frequency switches (KS–1 through KS–7) operate and prepare the tone oscillator for oscillation at the selected compound signal frequency.

(2) Switch contacts *a* and *b* of KS–8 open the seize frequency circuit.

(3) Switch contacts *c* and *d* of KS–8 open the circuit to a microphone bypass capacitor 68 and resistor 69.

(4) Switch contacts *g* and *h* of KS–8 remove the tone oscillator inhibit signal.

The tone oscillator now operates at the preselected frequencies. The digit selection sidetone is controlled by resistor 71. The microphone output during digital selection is low because its DC is lowered by removing resistor 69 and its AC path impedance is increased by removing capacitor 68.

When the digit keysender pushbutton switch is released, all the KS–8 switch contacts restore to normal. Contacts *g* and *h* close first, which inhibits further oscillations.

During conversation, incoming speech signals are received across transformer 72 and by way of hookswitch contact HS–1. Silicon switch 46 remains conducting as long as hookswitch contact HS–5 is closed. Sidetone is introduced to the bridge circuit over capacitor 73. The tone detector remains active but serves no useful function during voice transmission. The input impedance of the tone detector is high as compared to the voice circuit impedance; therefore, negligible speech power is lost.

*Terminating a call*

At the end of conversation, the telephone set handset is placed on-hook and the following operations take place:

(1) Hookswitch contacts HS–7 and HS–6 prepare the tone oscillator for release frequencies.

(2) Hookswitch contacts HS–1 and HS–5 open, disabling the speech circuit.

(3) Hookswitch contacts HS–8 transfer to provide power to the tone oscillator.

(4) Hookswitch contacts HS–3 transfer, enabling the tone ringer.

(5) Hookswitch contacts HS–4 transfer (this function will be further described under the heading "Extension Control").

When the action listed above has taken place, the tone oscillator is powered from the release timing circuit. The oscillator inhibit signal is removed by the action of hookswitch contact HS–5, which opens the circuit to silicon switch 46. The tone oscillator operates at the release frequencies (941 and 1,632 c.p.s.) until it is disabled by the action of the timing circuit. Release tone is transmitted for a period of time not less than 2 seconds and not more than 6 seconds.

*Answering an incoming call*

An incoming ringing signal from the switching center is detected by the tone detector and converted to a DC potential which energizes the tone ringer and tone oscillator. The oscillator operates at the release frequencies (941 and 1,632 c.p.s.) and develops a signal across inductor 39. The signal is applied to the tone-ringer base circuit across capacitor 51. Transistor 44 amplifies the signal and energizes the tone-ringer transducer 50 which produces an audible tone. During the ringing cycle, the audible tone is interrupted at a 16 cycle-per-second rate, in response to the interruption rate of the incoming ringing signal.

When the answering party lifts the handset off-hook in response to the audible ringing tone, seize tone is inhibited by the action of the tone detector and the silicon switch circuit under the following conditions: If the off-hook condition is established 250 milliseconds before the end of a burst of ringing; if the off-hook condition is established during a silent period, in which case seize tone is extended as ring-trip tone and ring-trip-trip tone is returned to inhibit seize. The absence of seize tone completes the connection to the calling party. In the presence of a ringing signal or ring-trip-trip signal, the tone detector output supplies power to operate silicon switch 46 when the required timing period has elapsed. The operation of silicon switch 46 inhibits the tone oscillator and enables the microphone.

*Extension control*

Extension control is effected by the action of hookswitch contacts HS–4 and HS–5 and diodes 74, 75, 76 and 77. Note that switch contact HS–5 closes before HS–4 transfers when the telephone handset is lifted off-hook.

Assume that a distant telephone set (telephone set B) is off-hook and transmitting seize tone, digit frequencies or speech signals. The local telephone set (telephone set A), which is on-hook, receives a negative D potential over hookswitch contact HS–4. The DC signal performs the functions listed below:

(1) Inhibits the tone detector over diode 74 and prevents incoming speech signals from enabling the tone ringer.

(2) Prepares silicon switch 46 to conduct when hookswitch contact HS–5 closes.

(3) Inhibits the oscillator over diode 77 and resistor 78. (This function is not useful at this time.)

(4) Provides a discharge path for release timing circuit capacitor 61. (This function is not useful at this time.)

When telephone set A goes off-hook, switch contacts HS–5 closes before HS–4 transfers and enables silicon switch 46. When silicon switch 46 conducts, the microphone 16 is enabled and an inhibit signal is applied to the tone oscillator by way of digit keysender switch contacts *g* and *h* of KS–8. Therefore, when telephone set A is taken off-hook while telephone set B is already off-hook, the telephone set A seize tone is inhibited and its microphone is enabled.

Assume that the telephone set A handset is placed on-hook while telephone set B is still off-hook. Telephone set A receives a negative signal which performs the following essential functions:

(1) Immediately inhibits release tone by way of resistor 78 and diode 77.

(2) Discharges release timing circuit capacitor 61 by way of diode 79 and resistor 80, which prevents the release of telephone set A should telephone set B go on-hook shortly after telephone set A.

(3) Prevents double release tones in the event that the two telephone sets go on-hook within a time period of not less than 100 milliseconds.

As a result of the functions listed above, only the first telephone set to go off-hook will transmit seize tone; and only the last telephone set to go on-hook will send release tone. An off-hook telephone set will inhibit the tone detectors of all on-hook telephone sets on the same extension. The microphone of any telephone set going off-hook will be enabled if another telephone set is already off-hook. Multiple release tones will be prevented if on-hook conditions are separated by at least 100 milliseconds.

In addition to the extension control characteristics given in the above paragraph, the circuit functions listed below apply to extension control:

(1) While one telephone set is off-hook and transmitting seize tone, another station going off-hook during this period will receive seize tone at the handset receiver at voice sidetone level.

(2) When a number of telephone sets are off-hook, any one set is capable of transmitting digit selection frequencies.

(3) When a number of telephone sets lift off-hook at precisely the same instant, multiple seize tone will be transmitted.

(4) When a number of telephone sets go on-hook at precisely the same instant, multiple release tone will be transmitted.

(5) In the absence of a control signal from any extension telephone set a given telephone set will transmit seize tone and release tone for each off- and on-hook condition respectively, regardless of the previous circuit condition.

What is claimed is:

1. A tone detector for a telephone instrument comprising: an input transformer, a tuned amplifier having input and output electrodes, means coupling said transformer to said input electrode, means for biasing said tuned amplifier for class C operation, a resistor connected to said input electrode, a source of bias potential, hook switch means for connecting said bias source to said resistor when said telephone instrument is in the off-hook condition, a converter transistor having base, emitter and collector electrodes, a bias voltage connected to said emitter electrode, means connecting said tuned amplifier output electrode to said base electrode, and means connected to said collector electrode for storing a DC potential.

2. A tone detector for a telephone instrument comprising: a transformer having a secondary winding, a bias voltage supply having a source of bias potential and a reference potential, one terminal of said secondary winding being connected to said reference potential, a tuned amplifier transistor having base, emitter and collector electrodes, a first resistor connected between said base electrode and the terminal of said secondary winding opposite said one terminal, a bias impedance connected between said emitter electrode and said reference potential, a second resistor connected to said base electrode, hook switch means for connecting said bias potential to said second resistor when said telephone instrument is in the off-hook condition, and means connected to said collector electrode for converting the output therefrom into a DC potential.

3. A tone detector as set forth in claim 2 which further comprises: a tone ringer and second hook switch means for connecting said DC potential to said tone ringer when said telephone instrument is in the on-hook condition.

4. In a telephone instrument having input and output terminals, a microphone connected to said output terminals, means connected to said microphone to disable it when a DC potential is applied thereto, a tone ringer, and a tone oscillator connected to said tone ringer; a tone detector circuit comprising: a tuned amplifier connected to said input terminals, means connected to said amplifier for biasing it for class C operation, means connected to said amplifier for converting the output signal therefrom into a DC potential; first hook switch means for connecting said DC potential to said oscillator and said tone ringer when said telephone instrument is in the on-hook condition and for connecting said DC potential to said switch means during the off-hook condition; and second hook switch means for connecting an additional biasing voltage to said biasing means during the off-hook condition to bias said tuned amplifier for class A operation so that the off-hook sensitivity of the tone detector is increased.

5. A telephone instrument comprising: a pair of input terminals, a microphone, a tone ringer, a tone oscillator connected to said tone ringer, switch means connected to said oscillator and said microphone for enabling said microphone and inhibiting said oscillator upon application of a DC control voltage to said switch means, an amplifier, means to bias said amplifier for class C operation, means to connect said input terminals to the input of said amplifier, means connected to said amplifier to convert the output signal therefrom into a DC potential, first hook switch means for connecting said DC potential to said switch means in the off-hook condition of said instrument and for connecting said DC potential to said oscillator and said tone ringer in the on-hook condition, and second hook switch means for connecting an additional biasing voltage to said biasing means during the off-hook condition to bias said amplifier for class A operation so that the off-hook sensitivity of said amplifier is increased.

6. A telephone instrument comprising: an input transformer, a microphone, a tone ringer, a tone oscillator connected to said tone ringer, switch means connected to said microphone and to said oscillator for enabling said microphone and inhibiting said oscillator upon application of a DC control voltage to said switch means, a transistor amplifier having input and output electrodes, resistive means connected between said transformer and said transistor input electrode for biasing said amplifier for class C operation, means connected to said amplifier to convert the output signal therefrom into a DC potential, first hook switch means for connecting said DC potential to said switch means in the off-hook condition of said instrument and for connecting said DC potential to said oscillator and said tone ringer in the on-hook condition, a source of bias potential, a resistor connected to said transistor input electrode, and second hook switch means for connecting said bias potential to said resistor during the off-hook condition to bias said transistor amplifier for class A operation so that the off-hook sensitivity of said amplifier is increased.

References Cited

UNITED STATES PATENTS 3,227,813 1/1966 Talcott ............ 179—84

WILLIAM C. COOPER, *Primary Examiner.*

JAN S. BLACK, *Assistant Examiner.*

U.S. Cl. X.R.

325—492; 330—22, 40